United States Patent [19]
Kaatz et al.

[11] 3,720,388
[45] March 13, 1973

[54] METHOD OF AND APPARATUS FOR CONTROLLING A DEICER BOOT SYSTEM

[75] Inventors: Herbert W. Kaatz; Charles B. Small; Arthur G. Branch, all of Elyria, Ohio

[73] Assignee: Airborne Mfg. Co., Elyria, Ohio

[22] Filed: March 6, 1970

[21] Appl. No.: 17,129

[52] U.S. Cl. ............................................ 244/134 A
[51] Int. Cl. .............................................. B64d 15/18
[58] Field of Search ..................................... 244/134

[56] References Cited

UNITED STATES PATENTS

| | | | |
|---|---|---|---|
| 2,623,533 | 4/1971 | Spicer | 244/134 A X |
| 3,548,873 | 12/1970 | Kaatz et al. | 137/612.1 |
| 2,515,519 | 7/1950 | Lawrance et al. | 244/134 A |

Primary Examiner—Milton Buchler
Assistant Examiner—Gregory W. O'Connor
Attorney—Bosworth, Sessions, Herrstrom & Cain

[57] ABSTRACT

A method of and apparatus for controlling an inflatable aircraft deicer boot and a boot system. A principal feature involves inflating the boot until a predetermined boot pressure is reached normally independently of the time required. Pneumatic control apparatus disclosed involves self-energizing, fast-acting valves adapted to be controlled by electrically actuated means. The method and apparatus of the invention disclosed are suitable for use in connection with conventional deicer boots and engine-driven pressure and vacuum sources.

14 Claims, 7 Drawing Figures

INVENTORS
HERBERT W. KAATZ,
CHARLES B. SMALL,
& ARTHUR BRANCH
BY Bosworth, Sessions
Herrshmand Cain
ATTORNEYS

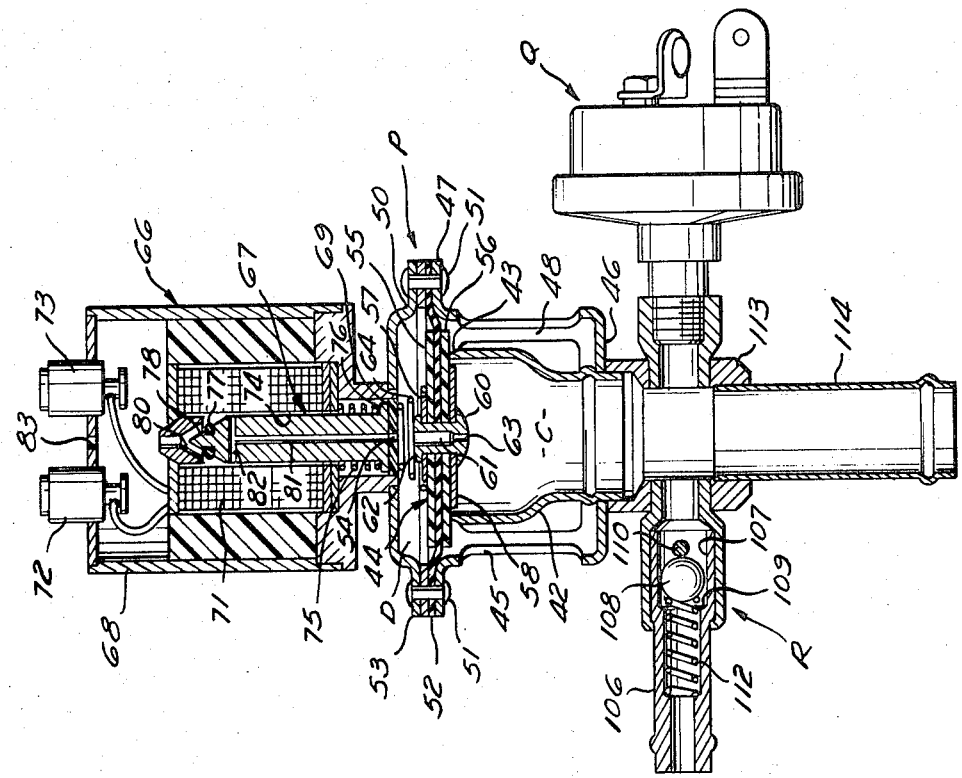

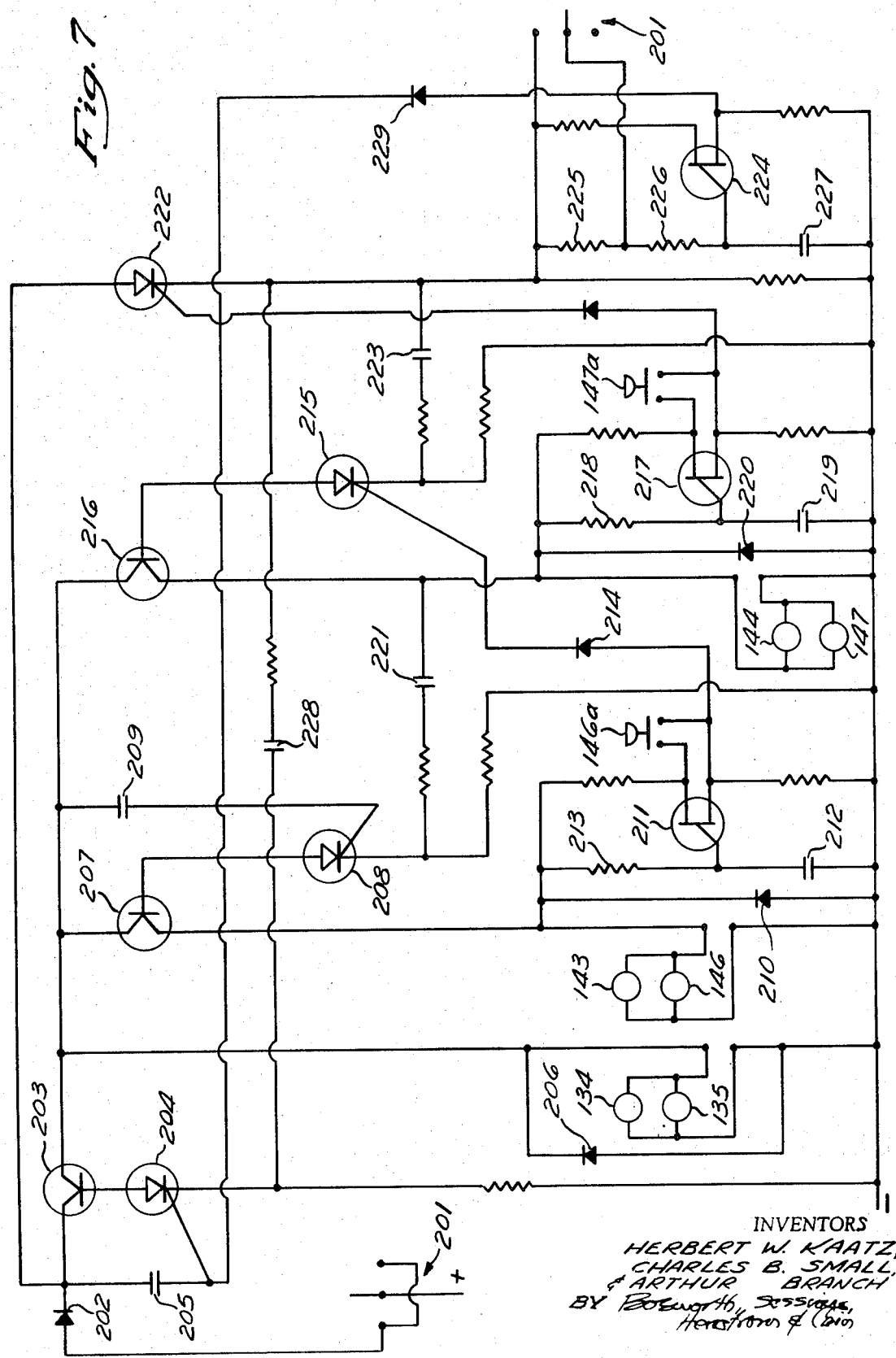

METHOD OF AND APPARATUS FOR CONTROLLING A DEICER BOOT SYSTEM

BACKGROUND OF THE INVENTION

This invention relates to systems for deicing flight surfaces of aircraft and, more particularly, to the type of deicer system in which an inflatable boot is mounted on those aircraft surfaces susceptible to icing in flight and is inflated periodically to dislodge accumulated ice.

In conventional deicer boot systems, inflatable "boots," typically made of rubber and/or NEOPRENE, are mounted on the leading portions of the wing and tail surfaces susceptible to icing. Normally, the boots are deflated and conform generally to the contour of the aircraft surface. Vacuum may be applied to them to hold them tightly to the surface to prevent them from wrinkling or otherwise moving and producing an undesirable aerodynamic effect. Should ice form and build up on the wing and tail surfaces during flight to the extent that their aerodynamic properties are adversely affected, the boots can be inflated by pneumatic pressure. When inflated, they expand and enlarge, shattering the ice and/or loosening it by relative shearing movement of the boots with respect to the ice along the contact face between them. The fractured and loosened ice is then blown away by the air flow over the boot surfaces. It will be apparent that the mechanics of ice removal by inflatable boots is such that fairly rapid inflation is desirable. If the inflation and expansion of the boots is too slow, ice may accumulate fast enough to bridge the fractures and build a shroud of ice inside of which the boot has room freely to expand and contract without disturbing the ice accumulation.

Typical known aircraft deicer boot systems are inflated by engine-driven pneumatic pumps normally also used to drive the aircraft gyro instruments, for example. Conventionally, a shuttle valve is used to connect the boots alternately to the vacuum and pressure side of the pump.

Such systems are operated in timed inflation-deflation cycles whenever icing conditions are encountered. Typically, the inflation and deflation times are nominally 6 seconds and 84 or 174 seconds, respectively. The systems also normally employ a relief valve to limit the maximum pressure applied to the boots.

Such systems have major shortcomings because they try to inflate a constant boot volume in a fixed time interval from a supply having a variable delivery rate. For example, engine-driven pump capacity to deliver inflation air varies with altitude and engine speed. A system having a pump sized for suitable inflation of its boots at a particular altitude and engine speed will tend to over- or underinflate at different altitudes and/or engine speeds. In multi-engine aircraft, the number of engine-driven pumps delivering air to the system can vary and, thus, introduce further variation in the system capacity to deliver air to the boots. Thus, fixed time inflation cycles degrade deicer boot system performance, either by wasteful discharge of excess capacity through a relief valve or by inadequate boot inflation.

The problem is compounded by the use of shuttle valves in conjunction with the timed inflation periods. It is not uncommon, for example, for the shuttle time of a valve to approach the programmed boot inflation time. During the time spent shifting the connection of the boots from one port to the other on the pump, the pump cannot supply pressure to inflate the boots so that, in effect, only a fraction of the pump capacity is being used. In many cases, boots operated in this manner are never completely inflated.

SUMMARY OF THE INVENTION

This invention comprehends a method of and apparatus for controlling the inflation of aircraft deicer boots from an engine-driven pneumatic pump. This method and apparatus relate the operation and its timing to the previously described operational variables, among others of such systems.

Each inflation cycle, inflation air is supplied to the deicer boots with the full capacity of the pump or pumps connected and available to the system until the pressure in the boots reaches a predetermined desired level. The boots are inflated to the same fullness on each inflation cycle, regardless of altitude or engine speed; albeit, the time required to do so will vary with altitude and engine speed, among other things. The inflation cycles are initiated by manual or automatic controls and are normally terminated only when the boots reach desired inflation pressure. There is no fixed time interval between the beginning and the end of the inflation cycle New and different pneumatic control apparatus is required and is comprehended by this invention. This apparatus includes valve assemblies for permitting and preventing full pump capacity to supply inflation air to the boots in response to boot pressure. Also included are pneumatic control devices for dumping inflation air from the boots, for connecting and disconnecting them to a vacuum source to hold them against the surface of the aircraft they overlie at all times except during inflation, and for isolating the pressure side of the system when the boots are subject to hold-down vacuum. The invention also comprehends the electrical means for actuating the valves and controls for effectuating desired system operation.

Yet another aspect of the invention involves the method of and apparatus for operating deicer boot systems having total boot volumes in relation to available pump capacity that are advantageously divided into sets to be inflated separately and in sequence. According to the invention, the inflation cycle of one set is terminated and the cycle for the next set initiated when the pressure is the one set reaches a predetermined desired level.

Finally, all the embodiments of this invention are compatible with and permit the operation of other pneumatic equipment including gyro instruments, both pressure and vacuum operated, and autopilots, all from the same pressure and vacuum sources employed in the deicer boot operation

BRIEF DESCRIPTION OF THE DRAWINGS

FIG. 2 is a side elevation in section of the control valve assemblies shown schematically in FIG. 1;

FIG. 3 is a side elevation in section of other control valve assemblies shown schematically in FIG. 1;

FIG. 7 is an electrical control circuit diagram suitable for use with the system of FIG. 5.

DESCRIPTION OF THE PREFERRED EMBODIMENT

Figure 1:
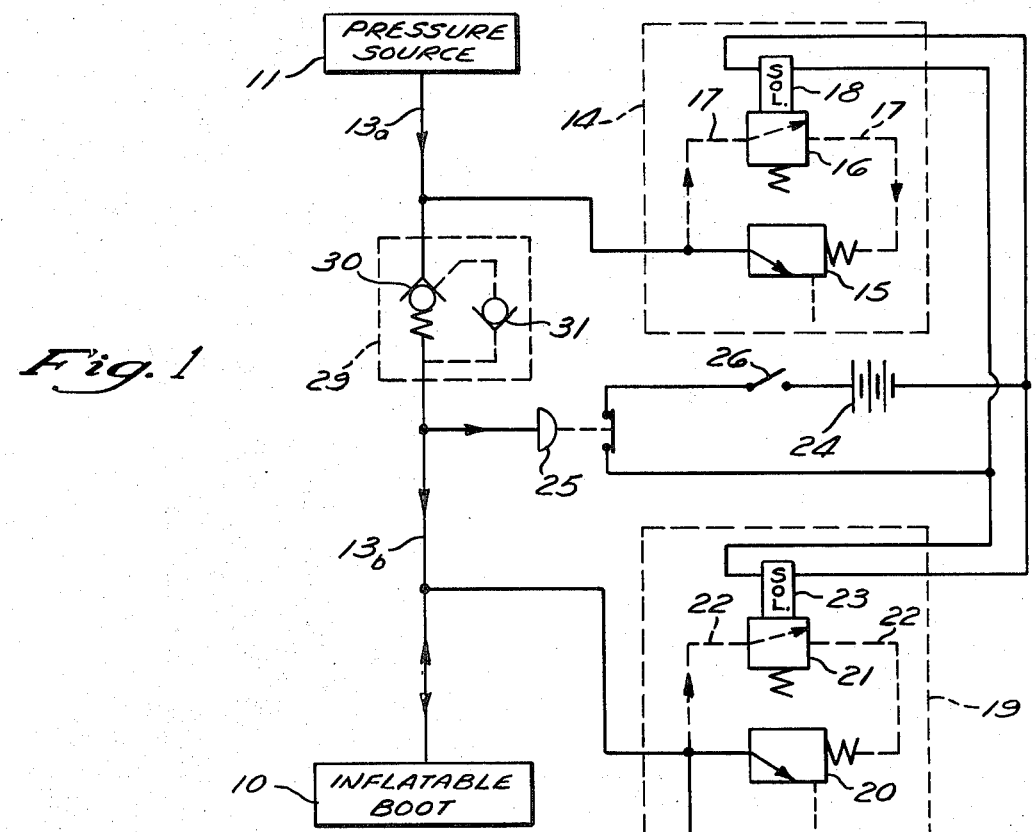
FIG. 1 is a schematic diagram of a simplified form of preferred embodiment of this invention.

FIG. 1 shows schematically an aircraft deicer boot system comprising an inflatable boot 10, a pressure source 11, and a vacuum source 12. The control elements comprising the system are shown by conventional graphic symbols. The control system in FIG. 1 comprehends the method and apparatus of this invention.

Pressure source 11 is any suitable source, such as an engine-driven dry vacuum pump conventionally used to pneumatically power aircraft instruments and autopilots as well as deicer boots. Pressure source 11 is connected by suitable conduits 13a and 13b to boot 10.

Inflatable boot 10 represents one or more inflatable boots of a conventional type used in known aircraft deicer systems. The boots are normally mounted on and against the leading edges of the wings and empennage and other surfaces upon which ice generally first accumulates in flight. They are made preferably from pieces of flexible, yieldable, elastic sheet material fastened along their edges by adhesive or other suitable means so that they conform smoothly to the aircraft surface on which they are mounted. Inflatable tubes which collapse and flatten when deflated but assume their tubular form when inflated are placed between the flexible elastic sheet material and the aircraft surface, extending longitudinally or chordwise of the wing or empennage leading edge, for example. The inflatable tubes are connected to the pressure source for inflation of the tubes when ice forms on the boots. As the tubes expand, the flexible elastic sheet material stretches and enlarges the contour formed by it to fracture the ice on its outside surface and to shear the ice from it as the sheet material yields elastically. The high-speed air flow past and over the boots blows away the broken-up and loosened ice.

Vacuum source 12 may be a conventional dry vacuum pump, for example. In fact, pressure source 11 and vacuum source 12 may comprise the same pump, the former being the positive pressure outlet side of the pump and, the latter, the negative pressure inlet side. Obviously, in multi-engine aircraft, more than one pressure and vacuum source, i.e., pump, may be provided and connected to the system. The method and apparatus comprehended by this invention comprehends such multi-source systems and is adapted to accommodate all operational aspects specifically connected with them as will be described more particularly below. The vacuum source 12 may also be a venturi device connected to the pressure source for producing a vacuum in a well-known manner.

Figure 4:
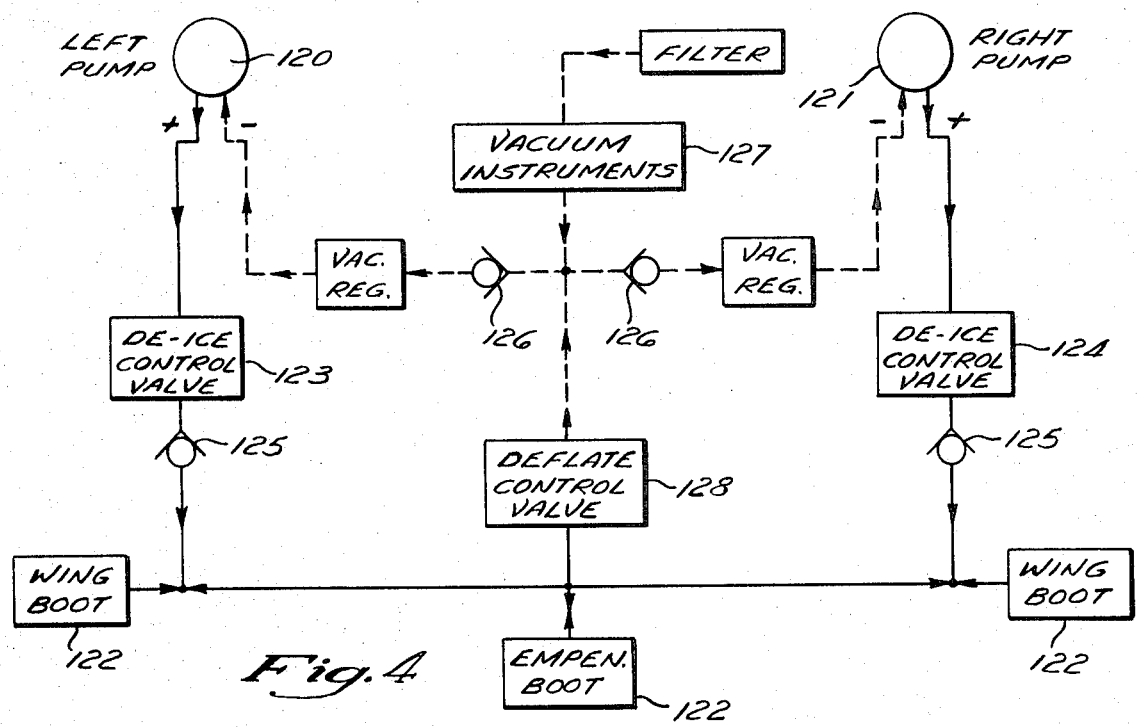
FIG. 4 is a schematic diagram of a simplified form of another preferred embodiment of this invention.
Figure 5:
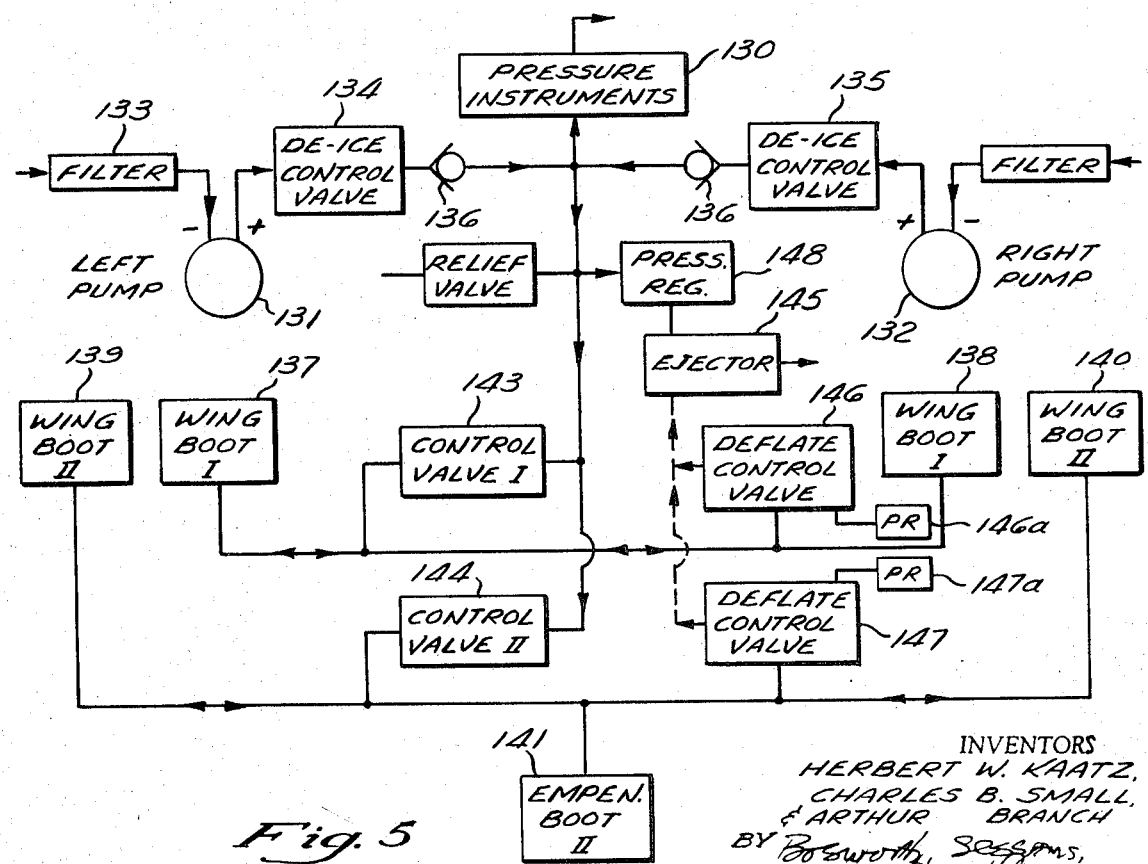
FIG. 5 is a schematic diagram of an embodiment of the invention involving a divided boot system for staged operation.

As mentioned earlier, pressure and vacuum sources 11 and 12 may be and commonly are employed to operate pressure- or vacuum-operated aircraft instruments. Although such instruments and/or an autopilot are not shown in FIG. 1, it should be understood that the invention comprehends the operation of such devices from the pressure and vacuum system employed in the deicer boot system shown in FIG. 1. FIGS. 4 and 5 depict systems embodying applications of this invention and flight instruments arranged to operate from the same pressure and vacuum sources.

When boot 10 is in a deflated condition, the output of pressure source 11 is diverted from the boot. Any excess not required for instruments, for example, is delivered to atmosphere by a deice control valve assembly represented by the symbols within broken outline box 14. Deice control valve assembly 14 comprises a spring-loaded pressure relief valve 15 connected to conduit 13a by a T-connection. When pressure in conduit 13a exceeds a level determined by its spring setting, for example, valve 15 dumps air from conduit 13a to atmosphere. Pressure relief valve 15 thus automatically maintains the pressure in conduit 13a at a level commonly determined by the requirements for pressure-operated flight instruments, for example, and at a level substantially lower than desired boot inflation pressure.

When boot inflation is desired, the full capacity of the pressure source is employed to inflate the boot as rapidly as possible. This is accomplished by holding pressure relief valve 15 closed against the escape of air to atmosphere with pilot pressure controlled by means of a spring-loaded valve 16 and pilot pressure conduit 17. As shown in FIG. 1, spring-loaded valve 16 is actuated by an electrical solenoid 18 which is energized and de-energized in a manner explained below. Closing spring-loaded valve 16, in effect, prevents pressure relief valve 15 from venting any air from source 11 to atmosphere so that the full capacity of pressure source 11 is supplied directly to inflatable boot 10. When boot 10 is to be deflated, pressure source 11 is diverted from boot 10 by opening valve 16 and removing pilot pressure from pressure relief valve 15 so that it is free to open to the extent permitted by its spring bias.

In order to deflate boot 10, it must be exhausted of inflation air. This is accomplished by a deflate control valve assembly represented by the symbols contained within broken outline box 19. Deflate control valve assembly 19 is made up of spring-loaded pressure relief valve 20 connected by a T-connection to conduit 13b. Normally, pressure in conduit 13b greater than required to overcome the spring bias opens the valve and air is vented to atmosphere. A spring-loaded valve 21 and pilot pressure conduit 22 provide means for holding pressure relief valve 20 closed against the full pressure of source 11 as may appear in conduit 13b. Spring-loaded valve 21 is actuated by an electrical solenoid 23 in a manner explained below.

Electrical solenoids 18 and 23 are connected in parallel across the series combination of battery 24 and the contacts of pressure-responsive electrical switch 25 and manual switch 26. Pressure-responsive electrical switch 25 is pneumatically connected to conduit 13b and is responsive to the pressure therein rising above a predetermined level to open its normally closed contacts. When both electrical switches 25 and 26 are closed, solenoids 18 and 23 are energized.

The inflate cycle is commenced by closing manual switch 26 to energize solenoids 18 and 23 and prevent the opening of deice pressure relief valves 15 and 20.

Full pressure from source 11 is delivered to inflatable boot 10 and no air is vented to atmosphere. In this manner, inflatable boot 10 is inflated as quickly as possible by pressure source 11.

When the pressure source is an engine-driven dry vacuum pump, its capacity and output will vary with altitude and atmospheric conditions, as is well known. With the system comprehended by this invention, however, the boot system is inflated in the shortest possible time for a given pump operating under a particular set of altitude and atmospheric conditions. Obviously, the time will vary depending upon the circumstances; but, under all circumstances, the full capacity of the pump will be employed and the inflatable boot will be inflated to its desired inflation pressure as rapidly as possible.

When the pressure within inflatable boot 10 reaches desired inflation pressure as predetermined by pressure-responsive switch 25, switch 25 opens to de-energize solenoids 18 and 23. Pressure relief valve 15 resumes its normal operation and diverts pressure source 11 from boot 10 by venting air to atmosphere. Pressure relief valve 20 of deflate control valve assembly 19 opens in response to pressure build-up in inflatable boot 10 and dumps the inflation air to atmosphere. The elastic nature of the boot material returns the boot to its deflated condition conforming generally to the aircraft surface upon which it is mounted. When the pressure in boot 10 has fallen and approaches atmospheric, pressure-responsive switch 25 returns to its normally closed position. Before switch 25 closes, it is necessary to reset manual switch 26 to the open position. Conventional automatic means, such as a momentary switch and a holding circuit, may be provided to conveniently accomplish this operation.

Inflatable boot 10 remains deflated until the next inflation cycle is initiated. In light aircraft use, systems embodying this invention are commonly under the direct control of the pilot who initiates each inflation cycle when desired by closing manual switch 26. Obviously, initiation of these inflation cycles can be accomplished automatically through timer devices so that inflation is initiated periodically at fixed intervals. It should be noted, however, that inflation pressure is supplied from source 11 to boot 10 for as long as is required to raise the pressure in the boot to a predetermined desired inflation level. At low altitude, desired inflation pressure is accomplished in a relatively shorter time than at a higher altitude. Thus, the time to inflate the boot is independent of any predetermined time interval and depends solely upon the volume of the boots to be inflated and the rate of delivery of inflation air to them.

As described above, a conventional aircraft deicer boot system having a boot or boots and a pressure source can be operated in accordance with the method comprehended by this invention by means of a deice control valve assembly 14 and deflate control valve assembly 19, together with pressure-responsive electrical switch 25. First, the full capacity of pressure source 11 is supplied to boot 10. Next, pressure source 11 is disconnected or diverted from boot 10 when the pressure in the boot reaches a predetermined inflation level. At the same time, deflate control valve assembly 19 dumps inflation air from boot 10 to atmosphere, deflating the boot and restoring it to the condition existing at the time the inflation cycle was initiated.

It will be apparent that the pilot pressure control valves 16 and 21 associated with pressure relief valves 15 and 20, respectively, in the FIG. 1 system, can be replaced by a single valve controlling the pilot pressure to both pressure relief valves since the latter valves always operate in unison. Also, the function of the electrical system for controlling a single or more pilot pressure control valves may be performed in accordance with this invention by an equivalent hydraulic control system.

In conventional deicer boot systems for aircraft, the boots are normally held down and otherwise encouraged to conform to the aircraft surface upon which they are mounted by connecting their inflatable chambers to a vacuum source. This may be simply and effectively accomplished in connection with the control system described above and this aspect of deicer boot operation is comprehended by and included in this invention. In the schematic showing of FIG. 1, the vacuum hold-down feature is provided by vacuum source 12 connected through suitable conduit 27 and check valve 28 (spring biased to the open position) to conduit 13b at a point between deicer control valve 14 and boot 10. Check valve 28 is arranged so that vacuum source 12 is connected to boot 10 when the boot is in a deflated condition. When pressure source 11 is connected to boot 10 and pressure builds in conduit 13b, check valve 28 closes, disconnecting vacuum source 12 from boot 10 and preventing pressure from source 11 escaping to the vacuum source 12. When boot pressure reaches the desired inflation level and inflation air is dumped to atmosphere by deflate valve assembly 19, check valve 28 opens as soon as boot pressure has reached a level insufficient to hold it closed against its spring bias. Obviously, the spring bias of check valve 28 is sufficient to resist any tendency to close as a result of vacuum source 12.

Another feature of a preferred form of deicer boot control system embodying this invention involves means for positively isolating the pressure source 11 from boot 10 when boot 10 is deflated and connected to vacuum source 12. This is accomplished by a pressure control check valve 29 located between boot 10 and deice control valve assembly 14.

Valve 29 behaves something like a relief valve and a check valve, and opens when the pressure of source 11 exceeds a predetermined level. The opening level is normally greater than the level at which deice control valve 14 vents pressure source 11 to atmosphere. Once control valve 29 is open in response to upstream pressure, it remains open, even at upstream pressures below its opening or cracking level so long as downstream or boot pressure is above substantially atmospheric pressure. Thus, during the inflation portion of the cycle of operation, control valve 29 opens and permits pressure from pressure source 11 to inflate boot 10.

During the deflation portion of the cycle when pressure source 11 is vented to atmosphere by pressure relief valve 15 of the deice control valve assembly and boot inflation air is dumped by pressure relief valve 20 and reduced substantially to atmospheric, valve 29 closes against regulated low pressure from pressure source 11 and against vacuum source 12. Thus, when boot 10 is deflated and being held down by vacuum, vacuum source 12 is dead-ended only against boot 10 and does not have to make up for any losses or escape to atmosphere through deice control valve 14.

The check valve apparatus whose operation is described above is diagrammatically represented in FIG. 1 by an in-line check valve 30 spring biased to a closed position. This checks air flow toward pressure source 11 and permits flow in the opposite direction when pressure overcomes the spring bias. As indicated, this is preferably at a pressure somewhat above the relief pressure of valve 15 and below the inflation pressure level to which pressure-responsive switch 25 responds. A check valve 31 is shown as permitting pilot pressure from the downstream side of check valve 30 to be applied directly to the ball valve member of check valve 30 to hold it open, for example, solely in response to downstream pressure. Thus, valve 30 will not close after being opened until downstream pressure falls to substantially atmospheric. The position of the ball valve member of check valve 30 depends upon the sum of the forces acting upon it; i.e., the resilient biasing means, and upstream and downstream pressure.

FIGS. 2 and 3 are cutaway views of actual deice control valve and deflate control valve assemblies, respectively, employed in successful operating systems comprehending the method and apparatus of this invention. The deice control valve assembly shown in FIG. 2 includes both an upper element, indicated generally at A, corresponding to pressure relief valve 15 in FIG. 1, and a lower element, indicated generally at B, corresponding to check valve 29 in FIG. 1. The apparatus shown in FIG. 3 includes elements P, Q, and R corresponding to pressure relief valve 20, pressure-responsive electrical switch 25, and spring-loaded vacuum control valve 28 in FIG. 1, respectively. The apparatus shown in FIGS. 2 and 3 comprises a preferred form of apparatus that is useful, but not the only apparatus for practicing the method of this invention. There will be apparent to those skilled in the art other means for performing the functions accomplished by the apparatus shown in FIGS. 2 and 3 and described below. This particular apparatus in the combinations found herein and, in some cases, by itself, however, is believed to be new and unique and unobvious to those skilled in the art working with known and conventional apparatus before them.

For convenience and economies in manufacturing and in mounting in an aircraft, for example, the units A and B of the FIG. 2 apparatus are mounted together as shown on the opposite ends of tubular valve body 40. They will perform their intended functions equally well as separate assemblies. A beaded tube 41 is fitted into an inlet port in the side of tubular body 40 for connection of both units to the pressure source of a system as shown in FIG. 1.

The pressure relief valve unit A of the apparatus shown in FIG. 2 is the same as the pressure relief valve unit P of FIG. 3. Since the following description of unit A also applies to unit P, like parts in the two units and figures are given the same reference number. The apparatus, per se, comprising units A and P of the assemblies shown in FIGS. 2 and 3 is disclosed and claimed in copending application Ser. No. 737,791, filed June 17, 1968, now U.S. Pat. No. 3,548,873 by Herbert W. Kaatz and Fred R. Wilhelm and assigned to the same assignee as is this application. A description of its structure and operation is included here for convenience in understanding its contribution to the novel combinations and assemblies disclosed herein.

Unit A comprises a cylindrical sleeve 42 fitted in one end of valve body 40 to form a chamber indicated generally at C in communication through beaded tube 41 with the pressure system. The free end of cylindrical sleeve 42 comprises an annular valve seat 43 closed by a valve closure assembly indicated generally at 44. A cylindrical spider or cage 45 having base and upper radial flanges 46 and 47 spaced apart by legs 48 is mounted on one end of and surrounds valve sleeve 42. Upper radial flange 47 lies in a plane slightly above annular valve seat 43.

The upper opening of housing spider 45 is closed by a circular flanged cap 50 having a raised central area and attached to upper flange 47 by means of rivets 51. A flexible diaphragm 52 is clamped between flange portion 53 of cap 50 and upper flange 47 of spider 45. Flexible diaphragm 52 carries and permits valve closure assembly 44 to move toward and away from valve seat 43 and into a position of sealing engagement with the seat. Flexible diaphragm 52 also closes the otherwise open and downwardly-facing side, as shown, of flanged cap 50 and, together with cap 50, forms a closed chamber D. A hole or passage 54 in cap 50 vents chamber D to atmosphere.

Valve closure assembly 44 preferably includes two valve discs 55 and 56 of slightly less diameter than the unclamped portion of diaphragm 52 and of greater diameter than annular valve seat 43. The two discs are mounted on opposite sides of the diaphragm concentrically of the valve sleeve and are clamped between washers 57 and 58. Rivet 60 passes through the center of the entire valve closure assembly and is axially aligned with valve sleeve 42.

Rivet 60 in unit A is provided with a counterbore 61 entering from its upset end 62 and terminating in a fine orifice or passage 63 extending on through the rivet to its other end. Fine passage 63 places the inlet side of valve seat 43 and valve closure assembly 44 in communication with the opposite side of diaphragm 52. The advantage and utility of passage 63 is described below.

Valve closure assembly 44 is provided with resilient biasing means in the form of compression spring 64. The strength of spring 64 determines the pressure required in valve sleeve 42 to unseat valve closure assembly 44.

Chamber D formed by cover cap 50 and the upper side of diaphragm 52 and including valve closure assembly 44 carried by it is connected with atmosphere through vent hole 54 in cap 50.

Chamber D, including its holes or passages 54 and 63, comprises a pilot pressure-operated means for permitting and preventing valve closure 44 to be opened by system pressure. When vent hole 54 is open to atmosphere, pressure within chamber D is also at atmospheric and the valve closure assembly and diaphragm are free to lift off the valve seat when system pressure exceeds a level predetermined by spring 64. Passage 63 through rivet 60 preferably is fine and relatively smaller than vent hole 54 in cap 50. Thus, although passage 63 is always open and bleeding system or inlet pressure to chamber D, the pressure level therein cannot build above the atmospheric level so long as vent hole 54 is open. Passage 63 is so fine that it has a negligible effect on the level of system pressure.

When vent hole 54 is closed, however, system pressure bled through fine passage 63 does build in chamber D up to system pressure level. With system pressure both above and below the diaphragm and valve closure assembly, the valve will not open regardless of the level reached by system pressure. Spring 64 is always acting to keep the valve closed, of course, and the differential in the active areas at system pressure above and below the diaphragm insures the sealing engagement of closure assembly 44 and valve seat 43.

Thus, by simply opening and closing the small vent hole 54 in cap 50 at a small expenditure of force, the considerably greater force able to be developed by system pressure on the underside of valve closure assembly 44 is controlled. It is apparent that this advantage is gained by self-energizing the device and using system pressure itself to help accomplish its control. Actuation of this self-energized, pneumatically-operated means may be accomplished by any convenient means for effectively opening and closing vent hole 54 in cap 50. In the embodiment shown and described here, an electromagnetic solenoid is employed as described below.

An electromagnetic solenoid indicated generally at 66 is mounted atop flanged cap 50 and has an armature indicated generally at 67 arranged to move axially away and toward vent passage 54 as the solenoid is energized and de-energized, respectively. Solenoid 66 comprises a cylindrical case 68 centrally mounted on flanged cap 50. The central portion 69 of flanged cap 50 containing vent passage 54 is preferably non-magnetic material. The electrical construction of solenoid 66 is conventional, comprising coil winding 71 connected to terminals 72 and 73 atop case 68. Coil winding 71 is preferably potted in epoxy within cylindrical case 68 to insure against air leaks in solenoid 66 and through its junction to flanged cap 50.

Armature 67 of the solenoid is movable axially of central passage 74 through coil winding 71 and extending below the lower end of the coil. Armature 67 is urged downwardly in passage 74 and toward the position shown in FIG. 2 by spring 75 surrounding armature 67 and compressed between radial flange 76 on the lower end of the armature and the lower end of coil winding 71.

The upper end of armature 67 is fitted with an O-ring 77 in a groove on its conical surface 78. O-ring 77 cooperates with an annular seat 80 in the upper end of central passage 74 to close the upper end of the central passage when solenoid 66 is energized and armature 67 moves upwardly against the force of compression spring 75. Armature 67 is also provided with an internal axial passage 81 extending from its lower end and in communication with vent passage 54 into chamber D to an internal cross passage 82 extending transversely through the armature at a point below O-ring 77. The upper end of cylindrical case 68 above valve seat 80 is provided with a vent opening 83, placing the upper end of central passage 74 in communication with atmosphere.

The O-ring closure 77 and annular seat 80 on the one hand, and axial and cross passages 81 and 82 in armature 67 on the other, enable solenoid 66 to effectively close and open chamber D in unit A to atmosphere. When solenoid 66 is de-energized, compression spring 75 moves armature 67 into its position shown in FIG. 2, placing chamber D in clear communication with atmosphere. The path of this communication is through passage 54 in flanged cap 50, along axial and cross passages 81 and 82 in armature 67, through upper end of central passage 74 of coil winding 71, between unseated O-ring closure 77 and annular seat 80, and, finally, through vent 83 in cylindrical case 68. When solenoid 66 is energized, armature 67 is raised and O-ring closure 77 is urged into sealing engagement with annular seat 80, effectively closing the path between chamber D and atmosphere.

The opening and closing of the communication path between chamber D and atmosphere acts to permit and prevent, respectively, the opening and moving away of valve closure assembly 44 from valve seat 43 by system pressure. When solenoid 66 is not energized, chamber D is at atmospheric pressure as described above, permitting valve closure assembly 44 to move away from valve seat 43 when system or inlet pressure overcomes the force of spring 64. When the inlet pressure is not great enough to develop the force necessary to overcome spring 64, the valve closes. Thus, when solenoid 66 is not energized an its armature 67 is in the position shown in FIG. 2, unit A operates as a diaphragm-type pressure relief valve having a set point determined by the compression in spring 64.

When solenoid 66 is energized, chamber D is closed to atmosphere as described above. As explained above, because of fine passage 63 extending through rivet fastener 60, chamber D is placed in communication with the inlet side of unit A and the pressure introduced through fine passage 63 is confined to chamber D and serves to urge diaphragm 52 and valve closure assembly 44 into sealing engagement with valve seat 43. Thus, the valve is prevented from opening in response to inlet pressure ordinarily sufficient to overcome spring 64. Positive closing of the valve is assured because, as the force tending to open it increases, the force tending to close it also increases. Of course, the differential in areas on the upper and lower sides of the diaphragm serves to maintain the valve-closing force greater than the valve-opening force when chamber D is sealed from atmosphere.

It should be noted that chamber D is always supplied through fine passage 63 with inlet pressure to the extent permitted by the fineness of the passage. The passage is preferably fine enough that is has a negligible effect on the level of system pressure when chamber D is maintained at atmospheric pressure. Also, axial and transverse passages 81 and 82, as well as vent passage 83, are preferably larger than fine passage 63 to insure that no unintended pressure build-up occurs in chamber D.

In terms of the system shown in FIG. 1 and its operation described above, when solenoid 66 of unit A is not energized, system pressure is regulated to a level determined by spring 64. Excess pressure lifts valve closure 44 from valve seat 43 and vents the system to atmosphere. In conventional light aircraft systems having pressure-operated flight instruments, unit A is typically set to maintain system pressure at 3 psi.

When solenoid 66 is energized, valve closure 44 is prevented from lifting off valve seat 43 and relieving any pressure in the system.

The apparatus designated unit B, and first disclosed herein, is mounted on the opposite end of tubular valve body 40 from unit A and comprises a tubular valve body 85 surrounded by and supporting a cylindrical can 86. Can 86 has base and diaphragm-supporting flanges 87 and 88, respectively. A beaded outlet tube 89 is fitted into a port in the side wall of can 86. The free end of valve body 85 comprises an annular valve seat 90 which cooperates with valve closure assembly 91 carried on diaphragm 92. Diaphragm 92 is clamped between supporting flange 88 and the radial flange 93 of a cap 94 closing the end of can 86.

Valve closure assembly 91 comprises a pair of valve discs 95 and 96 lying against opposite sides of the central portion of diaphragm 92 and between a pair of valve washers 97 and 98. The pile-up of elements on diaphragm 92 is held together by a solid rivet 99. There is no passage for communication through the diaphragm. A spring 101 is compressed between valve disc 96 of the valve closure assembly and closure cap 94 to urge valve closure assembly 91 into sealing engagement with annular valve seat 90. A vent 102 preferably is provided in closure cap 94 to expose the facing side of diaphragm 92 to atmospheric pressure.

The pressure control valve constituting unit B described above is an in-line valve adapted to control flow through it between beaded connection tubes 41 and 89. Although flow may, under certain circumstances, proceed in either direction through unit B, in the following description of its operation, beaded tube 41 is referred to as an inlet and the side of valve closure assembly 91 facing it as the upstream side. The opposite side of valve closure 91 is, therefore, the downstream side and tube 89, an outlet.

When the valve is closed, the upstream pressure alone acts on an area lying within annular valve seat 90, and downstream pressure alone acts on the remaining exposed and unclamped area of diaphragm 92 and valve closure assembly 91. The valve will open to any combination of upstream and downstream pressures acting on their respective areas sufficient to overcome spring 101 and the ambient pressure to which one side of diaphragm 92 is exposed through vent 102. Otherwise, the valve is closed, preventing flow through it.

As used in the deicer boot control system shown in FIG. 1, a spring strength is selected that permits upstream pressure to open the valve at a level above the level normally maintained by unit A and below desired boot inflation pressure level. For example, if unit A maintains an instrument system supply pressure at 3 psi and pressure in the boot at full inflation is 18 psi, unit B might be set to open at the combination of an upstream pressure of 10 psi and substantially atmospheric downstream pressure.

In operation in the deicer boot system of FIG. 1, when the boot is deflated and solenoid 66 of unit A is de-energized, downstream pressure is below atmospheric as provided by vacuum hold-down and upstream pressure is automatically regulated to a low pressure. With the system in this condition, unit B control valve is closed, preventing flow between pressure source 11 to boot 10. When inflation is initiated by energizing solenoid 66 of unit A and the solenoid of the deflate control valve 19, unit A is held closed by pilot pressure. Pressure builds in unit B pressure control valve until it opens at a predetermined level. The valve remains open until boot pressure reaches the trip pressure of pressure-responsive switch 25. Opening of switch 25 de-energizes both solenoids. Pressure upstream of control valve unit B falls to the automatic regulation level of unit A. Even after the upstream pressure falls below its opening pressure, pressure control valve unit B remains open, however, so long as total upstream and downstream pressure acting on the full surface of the open diaphragm and valve closure assembly is sufficient to overcome compression spring 101. As boot 10 is vented to atmosphere and deflated through deflate control valve 19 and the downstream increment of the total pressure acting on the valve falls to substantially atmospheric, the control valve unit B closes and is urged in tight sealing engagement by vacuum hold-down acting on the boot. Thus, control valve unit B dead-ends the vacuum source when applied in the boot only and positively shuts it off from the pressure source. Unit B remains closed until the next inflation cycle is initiated.

Referring now to FIG. 3, the deflate control valve apparatus shown there is made up of three major elements, units P, Q, and R, corresponding to pressure relief valve 19, pressure-responsive electrical switch 25 and vacuum control valve 28, respectively, of FIG. 1. As stated above, unit P is the same as unit A of the control apparatus shown in FIG. 2 and described herein. Therefore, like parts in unit P of FIG. 3 and unit A of FIG. 1 bear the same numbers, and the two units respond to the same description. The operation of unit P in combination with the other elements of the deicer boot control system are described below.

Pressure-responsive switch unit Q is a conventional pneumatically-operated switch. The switch is normally closed except when applied pressure exceeds a predetermined level.

Vacuum control valve unit R comprises a conventional ball check valve, spring biased toward its open position. The valve comprises a tubular body 106 having a central portion 107 of enlarged bore in which ball closure 108 is captured. One end of enlarged bore 107 comprises a valve seat 109 against which ball 108 can seat and seal. Ball 108 is prevented from seating at the other end of enlarged bore 107 by a transverse stop pin 110. A compression Spring 112 biases ball 108 away from seat 109 and against pin 110.

Units P, Q, and R are all connected directly to boot 10 through conduit 13b downstream of deice control valve assembly 14. For convenience and economy in manufacture and installation, they may be mounted together on a single hollow body 113 provided with a single beaded tube 114 for connection into the system at a single point.

In operation in a deicer boot system such as is represented diagrammatically in FIG. 1, the free end of ball check valve body 106 is connected to vacuum source 12 and beaded tube 114 is connected to boot 10 through a suitable conduit. When the boot is in a delfated condition, the switch of pressure-responsive unit Q is in deflated normally closed position and manual switch 26 is open. In pressure relief valve unit P, solenoid 66 is de-energized and valve closure assembly 44 is seated against valve seat 43 by compression spring 64. Ball closure 108 of vacuum control unit R is held away from its seat by compression spring 112 opening vacuum source 12 to boot 10 to hold the boot material against the flight surfaces. Spring 112 is strong enough to resist any tendency of the reduced pressure of vacuum source 12 to close the ball closure when the system is in the deflate condition. The sub-atmospheric pressure in the body 106 and, therefore, in tubular valve chamber C of pressure relief valve unit P also tends to hold its valve closed.

When the inflate cycle is initiated by closing switch 26, for example, solenoids 66 in FIGS. 2 and 3 are energized. Pressure supplied boot 10 is reflected in hollow body 113 of the FIG. 3 deflate control valve apparatus. Pressure relief valve unit P is prevented from opening by pilot pressure bleeding through fine orifice 63 from body 113 and acting on the solenoid side of its diaphragm. The pressure in hollow body 113 is also sufficient to overcome spring 112 of ball check valve unit Q and to urge ball closure 108 into sealing engagement with seat 109.

When boot inflation pressure reaches the opening level of pressure-responsive switch 25, i.e., the desired inflation pressure, solenoids 66 of pressure relief valve units A and P are de-energized and their valve closures open. Air from pressure source 11 in excess of any low level requirements such as instruments is vented to atmosphere and the source effectively disconnected from boot 10. Boot 10 is exhausted to atmosphere through pressure relief valve of unit P of deflate control valve assembly 19. When boot pressure drops enough to permit spring 112 of vacuum control valve unit R to unseat ball closure 108, vacuum source 12 is connected to the boot system and provides the preferred "hold-down" for the boot. Pressure-responsive switch 25 closes approximately as boot pressure falls below its set opening level. Prior to this, switch 26 has been manually or automatically reset to the open position. The system and deflate control valve assembly 19 remains in this condition until the inflate cycle is again initiated.

The method and apparatus of this invention comprehend and are useful with and may be adapted to systems and circumstances other than the relatively simple system represented diagrammatically in FIG. 1. FIGS. 4 and 5 are examples of such other systems.

FIG. 4 shows diagrammatically a system for operating and controlling a set of wing and empennage deicer boots on a twin-engine aircraft having vacuum-driven flight instruments. Pressure source 11 and vacuum source 12 of the FIG. 1 system are combined in each of two engine-driven dry vacuum pumps 120 and 121. Each pump has a positive pressure outlet indicated by a " + " sign and a sub-atmospheric pressure inlet indicated by a " − " sign comprising pressure and vacuum sources, respectively, such as 11 and 12 in FIG. 1. Such a pump is described in U.S. Pat. No. 3,286,913 issued Nov. 22, 1966, to Herbert W. Kaatz and Leo Tobacman.

Each wing and the empennage is provided with an inflatable deicer boot or boots 122 corresponding to element 10 in FIG. 1 and as may be desired and appropriate for the aircraft. The boots are connected together and to the positive outlets of each of the pumps as indicated by the heavy solid lines in FIG. 4. The connection of pumps 120 and 121 to the boot set is made through and under the control of a deicer control valve 123 and 124, each of which corresponds to element 14 in FIG. 1, and such as the apparatus shown in FIG. 2. A check valve 125 is provided between each deice control valve and its connection to the boot system and arranged to permit flow only away from its associated pump and toward the boot system. In the event of an engine or pump failure, such a check valve arrangement prevents the output of the operating pump from being diverted from supplying the boots, and contributes to the failsafe operation of the entire system. Check valves 126 are also provided ahead of the vacuum inlet side of each pump to isolate its associated pump from the system in the event the pump ceased to operate. Vacuum regulators associated with the inlet of each pump are also shown.

The inlet or vacuum side of both the pumps 120 and 121 is connected through conduits indicated by broken lines to vacuum instruments represented by outline 127 and draws air through them to operate their gyros. The air is preferably filtered before entering the instruments as indicated. The vacuum side of both pumps 120 and 121 is also connected to deflate control valve 128 in the same manner as vacuum source 12 in FIG. 1 to provide hold-down vacuum to the boots. Deflate control valve 128 in FIG. 4 corresponds to element 19 of FIG. 1 and may be apparatus such as shown in FIG. 3.

An important advantage of the FIG. 2 deice control valve when used in the system shown in FIG. 4 is that, except for the brief periods of inflation of the boots, the deicer system imposes a negligible load on the pumps. The valve's pressure relief unit A can be set to open at a very low positive pressure when its solenoid is not energized, thereby contributing to a low pressure difference across the pump and, thus, to reduced wear and increased life. Also, the control valve unit B isolates each deice control valve and the positive side of its associated pump from the system when in the hold-down condition by acting as a check valve against the escape of vacuum applied to the boot system. In addition, the multi-engine system of FIG. 4 and the novel elements thereof operate in accordance with the principles of the system shown in FIG. 1. The apparatus of FIGS. 2 and 3 may be used separately or jointly, retaining all the basic advantages of this invention, including the advantageous method of operating deicer boots. In particular, the inflation period of the system of FIG. 4 is controlled by boot pressure through a pressure-responsive means.

Another twin-engine installation of a deicer boot system comprehended by this invention is shown in FIG. 5. This system combines the deicer boot system with pressure-operated instruments represented by outline 130 and has no apparatus connected to the sub-atmospheric inlet side of the pumps. In addition, a large set of deicer boots is divided into smaller sets arranged to be inflated separately and in sequence in order to effectively increase the inflation capability of otherwise adequate pumps.

The pressure source comprises left and right engine-driven dry vacuum pumps 131 and 132, respectively, having their inlets connected only to suitable air filters 133 and their positive pressure outlets connected to the pressure system through deice control valves 134 and 135, respectively, and conventional check valves 136 as shown. Deice control valves 134 and 135 both correspond to element 14 of FIG. 1 and apparatus such as element A of the device shown in FIG. 2. The pressure system is continuously supplied with a minimum pressure for operating the aircraft instruments as determined by deice control valves 134 and 135 and with a higher pressure whenever the boot inflation cycle is initiated. As shown diagrammatically in FIG. 5, a pressure regulator is preferably provided in the pressure line ahead of the pressure instrument in order to insure proper operating pressure for them. The higher system pressure for inflation is selectively and in sequence delivered to boot sets I (137–138) and II (139–141) by identical control valves 143 and 144, respectively.

Figure 6:
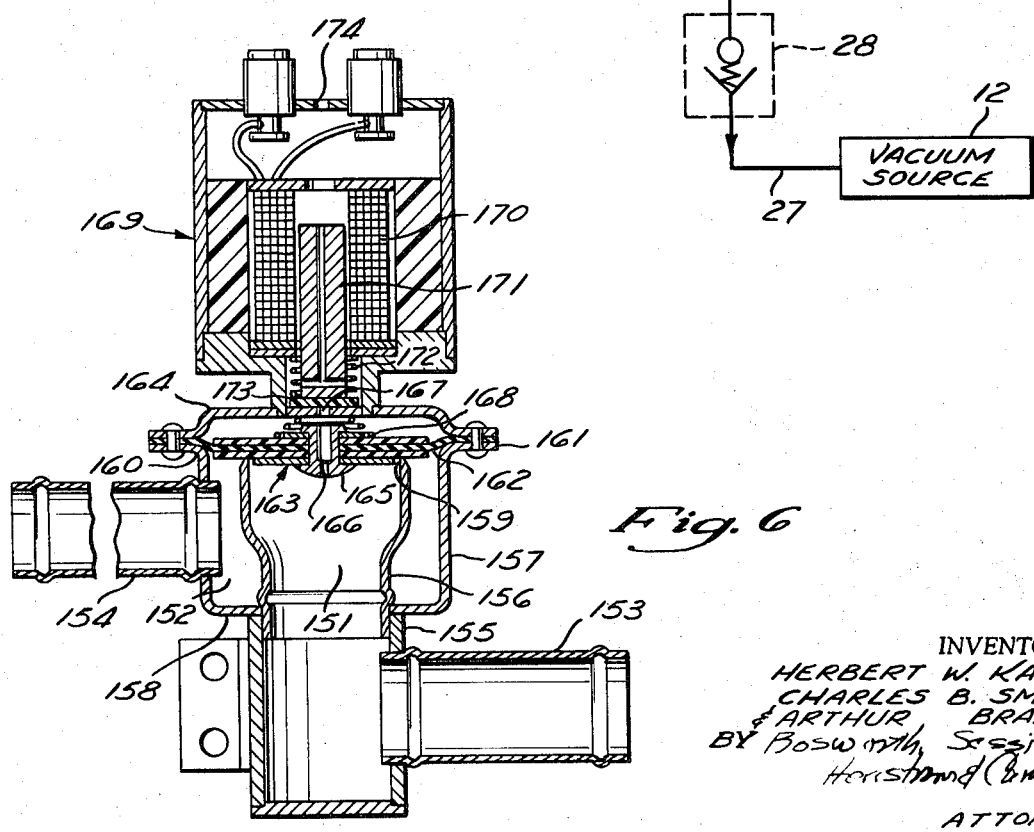
FIG. 6 is a side elevation in section of a control valve assembly shown schematically in FIG. 5.

Control valves 143 and 144 are normally closed in-line valves adapted to permit and prevent flow through them. When boot set I is to be inflated, control valve 143 associated with it is energized or actuated to its open position connecting boot set I only to the pressure system. Control valve 144 associated with boot set II remains closed. When boot set II is to be inflated, control valve 143 is de-energized and control valve 144 associated with it is actuated to its open position to connect boot set II to the pressure system. Closed control valve 143 disconnects boot set I from the system at this time. When neither boot set is to be inflated, both control valves 143 and 144 are de-energized and assume their normally closed position. This blocks any loss of hold-down vacuum to the pressure side of the system during the deflate periods of deicer boot operation. An actual valve suitable for performing as control valves 143 and 144 is shown in FIG. 6 and is described hereinafter.

In the system of FIG. 5, the vacuum source for boot hold-down is provided by a pressure-operated ejector device 145. This device is any conventional air jet-powered venturi having a connection at the venturi throat to the vacuum system. In particular, ejector 145 is connected to each boot sets I and II through deflate control valves 146 and 147, respectively. These valves correspond to deflate control valve assembly 19 of the system in FIG. 1 and may comprise apparatus such as is shown in FIG. 3 and described in connection therewith. Ejector device 145 is provided with an operating supply of pressure from the pressure system. Pressure regulator 148 automatically prevents too great a flow of air through the ejector at the higher pressure supplied during inflation of one of the sets of boots while allowing a sufficient jet to flow to maintain vacuum hold-down on the other and uninflated boot set.

Deflate control valves 146 and 147 include a pressure relief valve unit (shown separately and identified as 146a and 147a, respectively, in the drawings), a pressure-responsive switch unit, and vacuum control valve corresponding to elements 20, 25, and 28, respectively of the deflate control valve described in connection with the FIG. 1 system and the apparatus shown in FIG. 3, or their functional equivalent. When boot set I is being inflated, its associated deflate control valve 146 is closed to atmosphere and to the vacuum source. Deflate control valve 147 associated with uninflated boot set II is also closed to atmosphere but connects the vacuum source to boot set II. When boot set I reaches desired inflation pressure, the pressure-responsive element of deflate control valve 146 actuates control valve 143 to disconnect boot set I from the pressure source and opens deflate control valve 146 to atmosphere to permit the boot set to deflate. When deflation is completed, the vacuum control element of deflate control valve 146 connects ejector 145 vacuum source to the boot set for hold-down. These functions are the same as those preformed by deflate control valve assembly 19 in the FIG. 1 system described above.

In the system of FIG. 5 in which the boots are grouped in sets to be operated in sequence, pressure-responsive element of deflate control valve 146 performs the additional function of actuating and opening pressure control valve 144 and actuating and closing the vent and vacuum control valve of deflate control valve 147 to initiate the inflation of boot set II.

The inflation cycle of boot set II proceeds until full inflation pressure is reached and pressure-responsive switch of deflate control valve 147 is opened and boot set II deflated. The opening of this switch also de-energizes deice control valves 134 and 135, removing the higher pressure load from the pumps. The next-sequenced inflation cycle of the boot sets can be initiated manually when desired or can be controlled by a conventional fixed or variable time delay device.

A unique control valve suitable for use as control valves 143 and 144 in the system of FIG. 5 is shown in a side elevation in full section in FIG. 6.

The valve is a pressure-responsive, flow-control valve adapted to be connected in-line in a pneumatic system. The valve comprises two ported chambers, 151 and 152, provided with beaded connecting tubes 153 and 154, respectively. Tube 153 enters through the cylindrical side wall of valve body 155 closed at one end and fitted at the other to a sleeve 156 to form chamber 151. A can 157 having an in-turned base flange 158 and accessed by tube 154 is mounted on the sleeve end of body 155 to form chamber 152. Chamber 152 comprises a radially outer chamber surrounding inner chamber 151.

Both chambers 151 and 152 have open faces lying in substantially the same plane and bounded by the open ends 159 and 160 of sleeve 156 and can 157, respectively. End 159 of sleeve 156 provides an annular valve seat. End 160 of can 157 provides a circular mounting flange 161 for supporting the peripheral portion of a flexible diaphragm 162 carrying a valve closure assembly 163. Diaphragm 162, clamped around its edge between a cap 164 and end 160 of can 157, closes the open faces of both chambers 151 and 152 as well as supports valve closure assembly 163 for movement toward and away from valve seat 159 and into and out of sealing engagement therewith.

Valve closure assembly 163 comprises a pair of valve discs larger than valve seat 159 and lying on opposite sides of diaphragm 162. The discs are clamped between washers and all are held together by a rivet 165 passing through washers, discs, and diaphragm. Rivet 165 is provided with a fine orifice 166 passing from that side of the diaphragm closing chambers 151 and 152 to the other side covered by cap 164. A passage 167 in cap 164 vents the upper side (as shown) of diaphragm 162 to ambient pressure or atmosphere. Orifice 166 in rivet 165 is fine enough, however, to make negligible any pressure loss through vent 167 from the system. A compression spring 168 biases valve closure 163 toward sealing engagement with valve seat 159.

Vent 167 in cap 164 is opened and closed by a solenoid 169 having a coil winding 170 surrounding a movable armature 171. Spring 172 normally holds armature 171 in the position shown when the winding 170 is de-energized. In this position, a sealing disc 173 carried on the lower end of armature 171 closes vent passage 167 in cap 164. When the solenoid is energized, armature 171 compresses spring 168 and uncovers vent passage 167, placing it in communication with atmosphere through axial and cross passages in the armature, as shown, and vent passage 174 in the upper end of the soleniod housing.

In operation, when solenoid 169 is de-energized, the space between cap 164 and diaphragm 162 is sealed from atmosphere by sealing disc 173 closing passage 167. Thus, both sides of diaphragm 162 are subjected to the pressure in chamber 151 because of orifice 166 in rivet 165. Due to the difference in areas of the opposite sides of the diaphragm upon which the chamber 151 pressure is acting and spring 168, valve closure 163 is held in sealing engagement with valve seat 159 and flow through the valve is prevented. In this mode, only pressure in chamber 152 that is substantially in excess of that in chamber 151 can overcome the disparity in active diaphragm areas involved and the force of spring 168 to open the valve.

When solenoid 169 is energized, the space above diaphragm 162 is vented to atmosphere through passage 167 in cap 164. Valve closure 163 will now move out of sealing engagement with valve seat 159 when the sum of the forces produced on one side of diaphragm 162 by pressures in chambers 151 and 152 exceeds the force due to ambient pressure and spring 168 acting on the opposite side.

The valve of FIG. 6 provides a highly effective, yet simple means for controlling substantial flow in a penumatic system by self-energizing means and the simple application of relatively small forces; e.g., that required to close small vent passage 167 in cap 164.

FIG. 7 is a schematic diagram of an electrical circuit for use in controlling the deicer boot system shown in FIG. 5. As mentioned above, deice control valves 134 and 135 correspond to solenoid-actuated valve assembly 14 in FIG. 1 and, in particular, to element A of the apparatus shown in FIG. 2. It is the solenoid portion of this apparatus that is connected into the circuit of FIG. 7. In the circuit diagram, circular element symbols identified by reference numerals 134 and 135 represent the deice control valves of FIG. 5. Similarly, in FIG. 6, element symbols identified by reference numerals 143 and 144 represent control valves I and II of FIG. 5; element symbols identified as reference numerals 146, 146a, 147, and 147a represent the two deflate control valves, including their associated pressure-responsive switches as shown in FIG. 5

The circuit of FIG. 7 controls the operation of the various solenoids involved in the valves enumerated above by permitting and preventing their energization from the D.C. bus of the aircraft electrical system. In the circuit diagram, the bus is shown connected to the movable contact of a DPDT deice control switch indicated generally at 201. For convenience, one pole of the switch appears at the left-hand side of the diagram, and the other at the right, it being understood only one switch is involved and movement of one of the movable contacts shown requires corresponding movement of the other. One of the fixed contacts is connected through the supply diode 202 to the collector-emitter circuit of switching transistor 203. The base transistor 203 is connected to ground through SCR 204 so that, when SCR 204 conducts, transistor 203 is turned on. The gate of SCR 204 is connected through capacitor 205 to the cathode of diode 202. When switch 201 is closed and the circuit energized from the D.C. bus, a turn-on pulse is supplied by capacitor 205 and SCR 204 fires, rendering transistor 203 conducting.

Deice control valves 134 and 135 are connected in parallel between transistor 203 and ground so that, when deice control switch 201 is closed and transistor 203 conducts, the solenoids of valves 134 and 135 are energized and the pressure sources supply air at inflation pressure levels to the pressure system. When transistor 203 is off, the solenoids are de-energized and only relatively low pressure for operating the pressure instruments is supplied to the pressure system. A freewheeling diode 206 is connected in parallel with the solenoids of valves 134 and 135 to absorb their inductive energy when they are de-energized.

A second switching transistor 207 is connected between transistor 203 and ground through the parallel combination of the solenoids of deice control valve 143 and deflate control valve 146, both associated with boot set I of FIG. 5. Transistor 207 is controlled through its base circuit by SCR 208 arranged to conduct to ground when its gate is fired by a pulse from capacitor 209 produced when transistor 203 is turned on. Free-wheeling diode 210 is preferably provided across the solenoids of valves 143 and 146. Thus, when deice control switch 201 is closed, deice control valve 143 and deflate control valve 146 are energized and inflation air is supplied to and inflates boot set I.

Also connected in parallel with these valves is a timing circuit comprising a unijunction transistor 211 and a resistance-capacitance network. Unijunction transistor 211 will conduct when the potential on capacitor 212 charged through resistance 213 of the RC network reaches the breakover voltage of the transistor. When unijunction transistor 211 conducts, a pulse of current is sent through diode 214 to the gate of SCR 215, allowing SCR 215 to conduct, which, in turn, allows transistor 216 to conduct current. As capacitor 221 voltage changes from minus to plus, the cathode of SCR 208 is brought up to line voltage instantaneously and stops flow of current through SCR 208 which, in turn, stops current flow through transistor 207 to valves 143 and 146.

The normally open contacts of pressure switch 146a responsive to pressure in boot set I are also connected across the bases of unijunction transistor 211 so that a conducting path is provided which shunts current around unijunction transistor 211, causing the same result as the unijunction transistor breakover as described above, thereby closing off inflation air and venting boot set I to atmosphere, when the contacts of pressure switch 146a open in response to desired inflation pressure in boot set I.

In normal operation, valves 143 and 146 will remain energized, inflating boot set I, until pressure-responsive switch 146a closes. In the event of malfunction or failure, the timer circuit is set to fire and de-energize these valves after a predetermined interval, e.g., an interval equal to the longest average time required to inflate boot set I to its desired pressure under normally encountered operating conditions plus an arbitrary delay factor. The timer circuit is not necessary but is preferred as a back-up to pressure-responsive switch 146a.

When valves 143 and 146 are de-energized and boot set I starts to deflate, a firing pulse is provided through diode 214 connected between a base of unijunction transistor 211 and the gate of SCR 215. SCR 215 controls the base current of switching transistor 216 connected between the D.C. bus and ground through switching transistor 203. Switching transistor 216 is turned on when SCR 215 fires and is interconnected with the solenoids of pressure control and deflation control valves 144 and 147 to control their energization and the inflation of boot set II. Valves 144 and 147 are provided with a timer-actuated shunt path made up of unijunction transistor 217, resistance 218, and capacitor 219, as well as the normally open contacts of pressure switch 147a. The timer circuit and pressure contacts are arranged similarly to those associated with valves 143 and 146 controlling boot set I. Valves 144 and 147 are also provided with a free-wheeling diode 220.

When switching transistor 216 is turned on by the firing of SCR 215, a turn-off pulse, as previously described, is provided SCR 208 by capacitor 221 connected between the collector-emitter circuit of transistor 216 and the cathode of SCR 208. As a consequence, switching transistor 207 is turned off and the entire branch of the circuit associated with valves 143 and 146 of boot set I is disconnected from the power supply.

The closing of the normally open contacts of pressure switch 147a or the firing of unijunction transistor 217 will provide a pulse to SCR 222, causing it to conduct and provide a pulse through capacitor 223 connected to the cathode of SCR 215, turning off the latter. In addition, when SCR 222 conducts, a turn-off pulse is provided through capacitor 228 to the anode of SCR 204.

Conduction by SCR 222 also energizes a third timer circuit comprised of unijunction transistor 224, resistances 225 and 226, and capacitor 227. The other pole of DPDT deice control switch 201 is arranged as shown at the right-hand side of FIG. 7 to shunt resistance 225 if thrown in one direction and to leave resistance 225 in the RC network if thrown in the opposite direction. In this manner, the time to charge capacitor 227 to the breakdown voltage of unijunction transistor 224 can be varied to provide a shorter delay or a longer delay.

Thus, after SCR 222 has been rendered conducting upon deflation of boot set II and so long as unijunction transistor 224 is not yet conducting, all the solenoid-actuated control valves are de-energized so that system pressure is at its low level and all the deicer boots are in a deflated condition and subject to vacuum hold-down. When unijunction transistor 224 is fired by the potential of capacitor 227 being charged to its breakover voltage, a turn-on pulse is provided through diode 229 to the gate of SCR 204 controlling the conduction of switching transistor 203. Thus, the inflation cycle is again commenced after a timed delay and boot sets I and II are inflated and deflated in sequence.

It will be noted that, in normal operation, the full capacity of the pressure sources are delivered first to boot set I to inflate it. At this time, boot set II is deflated and subject to vacuum hold-down. When boot set I has reached desired inflation pressure, it is deflated and subjected to vacuum hold-down. The full capacity of the pressure source is supplied to boot set II until the pressure therein reaches the desired level; at which time, boot set II is deflated and subjected to vacuum hold-down. The inflation periods of both boot sets I and II are independent of time and depend solely upon boot pressure except as this normal operation may be modified by the takeover of the timer circuits provided to operate under emergency or abnormal circumstances.

From the foregoing, it will be appreciated that the invention disclosed herein and claimed below comprehends a novel method for controlling the operation of conventional aircraft deicer boots, which method involves inflating the boots with air until the pressure within them reaches a predetermined desired inflation level, normally independently of the time required to do so. Also comprehended by the invention are means for practicing the novel method, which means, themselves, are unique and achieve advantageous and unexpected results. The broadest understanding of this invention may be gained through this disclosure of the method of and apparatus for its practice and enjoyment.

Those skilled in the art will appreciate that various other changes and modifications can be made in the preferred form of apparatus described herein without departing from the spirit and scope of the invention.

We claim:

1. In an aircraft deicer boot system for removing ice from an aircraft surface and having an inflatable, expandable deicer boot mounted on said surface for general conformation to said surface upon deflation and for enlargement upon inflation, and a source of pneumatic pressure and a source of vacuum, the improved means for operating and controlling the system comprising inflation control means for selectively supplying air from said pressure source to inflate and expand said boot, and for preventing air from said pressure source from inflating and expanding said boot, deflation control means for selectively permitting and preventing said boot to be vented to atmosphere, said boot being deflated when vented to atmosphere, system control means responsive to an external signal for actuating both said inflation control means to supply air from said pressure source to inflate and expand said boot and said deflation control means to prevent said boot from being vented to atmosphere, pressure responsive means responsive to pressure in said boot for automatically actuating both said inflation control means to prevent air from said pressure source from inflating and expanding said boot and said deflation control means to vent said boot to atmosphere when boot pressure reaches a predetermined inflation level by virtue of air supplied from said pressure source.

2. The improved means of claim 1 for operating and controlling the system together with vacuum control means responsive to pressure in said boot for providing subatmospheric pressure from said vacuum source inside said boot when boot pressure is less than a predetermined level below said predetermined inflation level to tend to hold down said boot against the surface upon which it is mounted and for preventing air from said pressure source from being supplied to said vacuum source when boot pressure rises above a predetermined level upon inflation of said boot.

3. The improved means of claim 2 in which said vacuum control means comprises an in-line check valve interconnected between said vacuum source and said boot and having a valve seat, a valve closure member for sealingly engaging said seat to block flow through the valve from said boot to said vacuum source, and resilient means biasing said valve closure away from sealing engagement with said seat whereby flow in one direction through said valve is unchecked and flow in the other direction is permitted and prevented at flow rates below and above a predetermined value, respectively.

4. The improved means of claim 3 for operating and controlling the system together with pressure control means connected in-line in the system between said inflation control means on one side and said vacuum control means and said boot on the other and for permitting and preventing air to flow between said pressure source and said boot, said means comprising a valve biased closed by resilient means to prevent air flow through it and responsive to pressure in the system on both sides of said valve tending to open it to permit air flow through it whereby said means permits air to flow through it when the algebraic sum of the forces due to system pressures on said valve tending to open said valve exceed the biasing force of said resilient means tending to close said valve.

5. In an aircraft deicer boot system for removing ice from an aircraft surface and having an inflatable expandable deicer boot mounted on said surface for general conformation to said surface upon deflation and for enlargement upon inflation, and a plurality of sources of pneumatic pressure and a source of vacuum, the improved means for operating and controlling the system comprising inflation control means associated with each of said sources of pressure in the system for selectively providing air from its associated pressure source to inflate and expand said boot, and for preventing air from its associated pressure source from inflating said boot, deflation control means for selectively permitting and preventing said boot to be vented to atmosphere to deflate it, pressure-responsive means responsive to pressure in said boot for actuating said inflation control means associated with each of said pressure sources to limit air from inflating said boot and for actuating said deflation control means to vent said boot to atmosphere, both when boot pressure reaches a predetermined inflation level, vacuum control means responsive to pressure in said boot for providing subatmospheric pressure from said vacuum source inside said boot when boot pressure is less than a predetermined level below said predetermined inflation level and for preventing air from said pressure source from being supplied to said vacuum source when boot pressure rises above a predetermined level upon inflation of said boot, and pressure control means connected in-line in the system between said inflation control means on one side and said vacuum control means and said boot on the other and for permitting and preventing air to flow between said pressure source and said boot, said means comprising a valve biased closed by resilient means to prevent air flow through it and responsive to pressure in the system on both sides of said valve tending to open it to permit air flow through it whereby said means permits air to flow through it when the algebraic sum of the forces due to system pressures on said valve tending to open said valve exceed the biasing force of said resilient means tending to close said valve.

6. The improved means of claim 1 in which said inflation control means comprises a pressure relief valve having an inlet connected to said pressure source and to said boot and a vent outlet to atmosphere and a flow passage therebetween and a cooperating valve seat and valve closure including resilient means biasing said closure into sealing engagement with said valve seat for controlling communications between said inlet and said vent outlet through said flow passage, said pressure relief valve being responsive to the pressure level at its inlet to move said valve closure against the urging of said resilient means away from engagement with said valve seat and thereby open said passage when pressure in said inlet is above a predetermined opening level to limit pressure in said inlet to said predetermined level, and to permit said resilient means to close said valve closure against said valve seat and thereby close said passage when pressure in said inlet is below said predetermined opening level, pneumatically-operated means associated with said pressure relief valve and energized by pressure from the inlet side of its said valve closure and valve seat for selectively permitting and preventing its associated valve from opening, whereby said pressure relief valve limits pressure in said inlet to said predetermined opening level when said pneumatically-operated means permits the opening of said relief valve and provides no limit to or control of pressure at said inlet when said pneumatically-operated means prevents the opening of said relief valve.

7. The improved means of claim 6 in which said valve closure is carried on a flexible diaphragm having opposite faces, said flexible diaphragm being mounted on said valve with one face juxtaposed said valve seat and permitting movement of said closure to and away from said seat to open and to close said vent outlet, and said pneumatically-operated means comprises a chamber, said diaphragm comprising one side of said chamber, a relatively fine passage placing said chamber in communication with the inlet side of said valve seat for bleeding pressure from the inlet side into said chamber, and a relatively larger control vent passage from said chamber to atmosphere, whereby closing said control vent passage to atmosphere confines inlet pressure introduced into said chamber through said fine passage and tending to urge said diaphragm and said valve closure carried thereby toward sealing engagement with said valve seat and to prevent said valve from opening, and opening said control vent passage vents said chamber to atmosphere and prevents the build up of pressure above atmospheric in said chamber permitting said valve to open when said resilient biasing is overcome by the force of pressure at said inlet.

8. The improved means of claim 7 together with electrical solenoid-actuated means for closing and opening said control vent passage when said solenoid is energized and de-energized, respectively.

9. The improved means of claim 5 in which said deflation control means comprises a pressure relief valve comprising an inlet connected to said boot and a vent outlet to atmosphere and a flow passage therebetween and a cooperating valve seat and valve closure including resilient means biasing said closure into sealing engagement with said valve seat for controlling communication between said inlet and said vent outlet through said flow passage, said pressure relief valve being responsive to the pressure level at its inlet to move said valve closure against the urging of said resilient means away from engagement with said valve seat and thereby open said passage when the pressure in said inlet is above a predetermined opening level to limit pressure in said inlet to said predetermined level, and to permit said resilient means to close said valve closure against said valve seat and thereby close said passage when the pressure in said inlet is below said predetermined opening level, pneumatically-operated means associated with said pressure relief valve and energized by pressure from the inlet side of its said valve closure and valve seat for selectively permitting and preventing it associated valve from opening, whereby said pressure relief valve limits pressure in said inlet to said predetermined opening level when said pneumatically-operated means permits the opening of said relief valve and provides no limit to or control of pressure at said inlet when said pneumatically-operated means prevents the opening of said relief valve.

10. In an aircraft deicer system having a plurality of separately inflatable deicer boots to remove ice formed on them, and a source of vacuum and at least one source of pneumatic pressure supplying a pressure system, the improved means for operating and controlling the system comprising a pressure control means associated with each separate deicer boot for permitting and preventing inflation air to be supplied to its associated boot from said pressure system, a deflation control means associated with each separate deicer boot for permitting and preventing inflation air to be vented from its associated boot to atmosphere, control means for actuating in response to an external trigger signal both said pressure control means associated with a first one of said plurality of boots to inflate its associated boot from said pressure system and said deflation control means associated with the boot being inflated to prevent inflation air from being vented to atmosphere and all other of said deflation control means to vent their associated boots to atmosphere, sequence control means for sequentially actuating in response to internal trigger signals only each of said pressure control means associated with said plurality of boots other than said first to supply inflation air to its associated boot from said pressure system and at the same time for actuating said deflation control means associated with the boot being inflated to prevent inflation air from being vented to atmosphere and for actuating all other said deflation control means to vent their associated boots to atmosphere, a pressure-responsive means associated with each separate deicer boot and responsive to the pressure inside its associated boot for providing an internal trigger signal to said sequence control means when pressure in its associated boot reaches a predetermined level.

11. The improved means according to claim 10 together with an inflation control valve associated with each of said pressure sources for permitting and preventing inflation air to be supplied from said associated source to said pressure system, additional control means operatable to actuate said inflation control valve to permit inflation air to be supplied to said pressure system and to trigger said sequence control means to inflate a first one of said plurality of boots, and when the last of said plurality of boots reaches a predetermined inflation pressure level as sensed by its associated pressure-responsive means, to actuate said inflation control valve to prevent inflation air from being supplied to said pressure system and to interrupt the boot inflation sequence.

12. The improved means according to claim 10 together with a vacuum control means connected to said vacuum source and associated with each separately inflatable boot and its associated deflation control means and actuatable to permit and prevent said vacuum source from being connected to its associated boot when its associated deflation control means closes and vents, respectively, its associated boot to atmosphere.

13. A method of operating an inflatable aircraft deicer boot from a source of pressure to remove ice formed thereon comprising the following steps:
   1. connect a source of pressure to the boot to inflate it,
   2. disconnect a source of pressure from the boot inflated in step (1) in response to the attainment of a predetermined pressure level in the boot inflated in step (1), the initiation of said response being independent of time and the pressure level in any other deicer boot,
   3. connect the boot inflated in step (1) to a vent to atmosphere to deflate the boot inflated in step (1),
   4. disconnect the boot inflated in step (1) from the vent to atmosphere when the pressure in the boot inflated in step (1) reaches a predetermined level.

14. A method of operating an inflatable aircraft deicer boot from a source of pressure and a source of vacuum to remove ice formed thereon comprising the four steps of claim 13 and the two additional steps comprising:
   5. connect source of vacuum to boot to hold it down,
   6. disconnect source of vacuum from boot and repeat cycle beginning with step (1).

* * * * *